United States Patent
Yoon et al.

(10) Patent No.: US 11,882,285 B2
(45) Date of Patent: Jan. 23, 2024

(54) VIDEO SIGNAL PROCESSING METHOD AND DEVICE

(71) Applicant: LG ELECTRONICS INC., Seoul (KR)

(72) Inventors: Dahyun Yoon, Seoul (KR); Yoonjung Kim, Seoul (KR); Jonghun Yoo, Seoul (KR); Nara Lee, Seoul (KR); Sangheon Lee, Seoul (KR); Jaehyeok Lee, Seoul (KR); Taggun Lee, Seoul (KR); Heamin Lee, Seoul (KR); Taeil Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 17/424,146

(22) PCT Filed: Jan. 23, 2019

(86) PCT No.: PCT/KR2019/000942
§ 371 (c)(1),
(2) Date: Jul. 19, 2021

(87) PCT Pub. No.: WO2020/153512
PCT Pub. Date: Jul. 30, 2020

(65) Prior Publication Data
US 2022/0109843 A1 Apr. 7, 2022

(51) Int. Cl.
*H04N 19/13* (2014.01)
*H04N 19/124* (2014.01)
(Continued)

(52) U.S. Cl.
CPC ........... *H04N 19/13* (2014.11); *H04N 19/124* (2014.11); *H04N 19/136* (2014.11); *H04N 19/188* (2014.11); *H04N 19/63* (2014.11)

(58) Field of Classification Search
CPC .... H04N 19/63; H04N 19/188; H04N 19/136; H04N 19/13
See application file for complete search history.

(56) References Cited

U.S. PATENT DOCUMENTS

| | | | |
|---|---|---|---|
| 9,955,176 B2 | 4/2018 | Puri | |
| 2009/0092326 A1 | 4/2009 | Fukuhara et al. | |
| 2020/0128274 A1* | 4/2020 | Rosewarne | H04N 21/236 |

FOREIGN PATENT DOCUMENTS

| | | |
|---|---|---|
| WO | 2018114813 | 6/2018 |
| WO | 2019006488 | 1/2019 |
| WO | 2019011484 | 1/2019 |

OTHER PUBLICATIONS

PCT International Application No. PCT/KR2019/000942, International Search Report dated Oct. 21, 2019, 11 pages.
(Continued)

*Primary Examiner* — On S Mung
(74) *Attorney, Agent, or Firm* — LEE, HONG, DEGERMAN, KANG & WAIMEY

(57) ABSTRACT

The present invention relates to a method for decoding a bitstream for a video signal including at least one precinct, and a device for same. Specifically, the present invention relates to a method, and a device for same, the method including: a step for demultiplexing packets of the current precinct among the at least one precinct into a plurality of first packets and a plurality of second packets; and a step for entropy-decoding the plurality of first packets and the plurality of second packets in parallel, wherein the plurality of first packets and the plurality of second packets are respectively entropy-decoded in parallel by a first entropy decoder engine and a second entropy decoder engine, the plurality of first packets include packet 0, packet 1, packet 4, packet 6, and packet 8, and the plurality of second packets include packet 2, packet 3, packet 5, packet 7, and packet 9.

11 Claims, 11 Drawing Sheets

(a)

(b)

○ Luma sample     × Chroma sample

(51) Int. Cl.
    *H04N 19/136*    (2014.01)
    *H04N 19/169*    (2014.01)
    *H04N 19/63*     (2014.01)

(56) References Cited

OTHER PUBLICATIONS

Bruns, et al., "Decoding JPEG XS on a GPU," 2018 Picture Coding Symposium (PCS), IEEE, Jun. 2018, 5 pages.
Richter, et al., "Entropy Coding, Profiles and Levels of JPEG XS", Proceedings of SPIE; [Proceedings of SPIE ISSN 0277-786X vol. 10524], XP60110688A, Sep. 2018, 11 pages.
Richter, et al., "text of ISO/IEC 21122-1 (JPEG XS Part-1: Core Coding System) WD v3.0 ", XP30170393, Apr. 2017, 70 pages.
European Patent Office Application Serial No. 19911500.7, Search Report dated Aug. 10, 2022, 10 pages.

* cited by examiner (a)

(b)

(a)

(b)

* First plural packets include packets 0, 1, 4, 6, and 8
* Second plural packets include packets 2, 3, 5, 7, and 9

* First plural packets include packets 0, 1, and 6
* Second plural packets include packets 2, 3, and 7
* Third plural packets include packets 4 and 8
* Fourth plural packets include packets 5 and 9

VIDEO SIGNAL PROCESSING METHOD AND DEVICE

CROSS-REFERENCE TO RELATED APPLICATIONS

This application is the National Stage filing under 35 U.S.C. 371 of International Application No. PCT/KR2019/000942, filed on Jan. 23, 2019, the contents of which are all incorporated by reference herein in their entirety.

TECHNICAL FIELD

The present disclosure relates to a video signal processing method and device and, more particularly, to a method of processing a video signal in parallel using a plurality of entropy decoder engines, and a device therefor.

BACKGROUND ART

As services based on high-definition multimedia content such as digital multimedia or Internet broadcasting have been actively provided, video processing techniques for high compression and high speed have been demanded.

Specifically, as video content that supports a high dynamic range (HDR) of more than 10 bits per sample, a high frame rate of 120 frames per second (FPS) or 60 FPS, ultra-high definition (UHD) of 8K (e.g., 7680×4320 or 8192×4320) beyond UHD of 4K (e.g., 3840×2160 or 4096×2160) has increased, data volume has abruptly increased. In addition, services and applications that transmit such video content through wireless communication systems (e.g., 3GPP long term evolution (LTE), LTE-advanced (LTE-A), LTE-A Pro, 5G, new radio (NR), Wi-Fi (IEEE 802.11), etc.) or wired communication systems (e.g., Ethernet (IEEE 802.3)) have increased. Accordingly, a discussion on video compression standards such as versatile video coding (VVC), H.265/high efficiency video coding (HEVC), and H.264/advanced video coding (AVC) has been actively conducted.

However, since the video compression standards, such as VVC, HEVC, and AVC, are designed for high compression, rather than for low-latency and low-complexity video encoding/decoding, a discussion about a joint photographic experts group (JPEG)-extra speed and extra small (XS) (ISO/IEC 21122) standard that enables visually lossless compression while providing low-latency and low-complexity video encoding/decoding functions has recently continued. The JPEG-XS standard is a video compression technique optimized for video real-time streaming over a wireless system (e.g., a 5G, NR, or Wi-Fi system) or a wired system (e.g., Ethernet). A method and device for efficiently encoding/decoding a video signal based on the JPEG-XS standard has been actively discussed.

DETAILED DESCRIPTION OF THE DISCLOSURE

Technical Problems

An object of the present disclosure is to provide a method capable of improving entropy decoding performance, and a device therefor.

Another object of the present disclosure is to provide a packet demultiplexing method which is advantageous for parallel processing, and a device therefor.

Another object of the present disclosure is to provide an entropy decoding method capable of efficiently processing encoded bitplane count information in parallel based on a vertical prediction mode, and a device therefor.

The objects that may be achieved with the present disclosure are not limited to what has been particularly described hereinabove and other objects not described herein will be more clearly understood by persons skilled in the art from the following detailed description.

Technical Solutions

According to a first aspect of the present disclosure, provided herein is a device for decoding a bitstream for a video signal including at least one precinct, including a first entropy decoder engine; a second entropy decoder engine; and a demultiplexer configured to demultiplex packets of a current precinct among the at least one precinct into a plurality of first packets and a plurality of second packets, transmit the first plural packets to the first entropy decoder engine, and transmit the second plural packets to the second entropy decoder engine. The first entropy decoder engine and the second entropy decoder engine may perform parallel entropy decoding on the first plural packets and the second plural packets, respectively. The first plural packets may include packet 0, packet 1, packet 4, packet 6, and packet 8, and the second plural packets may include packet 2, packet 3, packet 5, packet 7, and packet 9.

According to a second aspect of the present disclosure, provided herein is a method of decoding a bitstream for a video signal including at least one precinct. The method is performed by a decoding device including a first entropy decoder engine and a second entropy decoder engine and includes demultiplexing packets of a current precinct among the at least one precinct into a plurality of first packets and a plurality of second packets; and entropy-decoding the first plural packets and the second plural packets in parallel. The first plural packets and the second plural packets may be entropy-decoded in parallel by the first entropy decoder engine and the second entropy decoder engine, respectively. The first plural packets may include packet 0, packet 1, packet 4, packet 6, and packet 8, and the second plural packets may include packet 2, packet 3, packet 5, packet 7, and packet 9.

The parallel entropy decoding may include parallel entropy decoding performed on packets 0 and 1 by the first entropy decoder engine and packets 2 and 3 by the second entropy decoder engine, parallel entropy decoding performed on packet 4 by the first entropy decoder engine and packet 5 by the second entropy decoder engine, parallel entropy decoding performed on packet 6 by the first entropy decoder engine and packet 7 by the second entropy decoder engine, and parallel entropy decoding performed on packet 8 by the first entropy decoder engine and packet 9 by the second entropy decoder engine.

According to a third aspect of the present disclosure, provided herein is a device for decoding a bitstream for a video signal including at least one precinct, including a first entropy decoder engine; a second entropy decoder engine; a third entropy decoder engine; a fourth entropy decoder engine; and a demultiplexer configured to demultiplex packets of a current precinct among the at least one precinct into a plurality of first packets, a plurality of second packets, a plurality of third packets, and a plurality of fourth packets, transmit the first plural packets to the first entropy decoder engine, transmit the second plural packets to the second entropy decoder engine, transmit the third plural packets to the third entropy decoder engine, and transmit the fourth plural packets to the fourth entropy decoder engine. The first entropy decoder engine, the second entropy decoder engine, the third entropy decoder engine, and the fourth entropy decoder engine may perform parallel entropy decoding on the first plural packets, the second plural packets, the third plural packets, and the fourth plural packets, respectively. The first plural packets may include packet 0, packet 1, and packet 6, the second plural packets may include packet 2, packet 3, and packet 7, the third plural packets may include packet 4 and packet 8, and the fourth plural packets may include packet 5 and packet 9.

According to a fourth aspect of the present disclosure, provided herein is a method of decoding a bitstream for a video signal including at least one precinct. The method is performed by a decoding device including a first entropy decoder engine, a second entropy decoder engine, a third entropy decoder engine, and a fourth entropy decoder engine and includes demultiplexing packets of a current precinct among the at least one precinct into a plurality of first packets, a plurality of second packets, a plurality of third packets, and a plurality of third packets; and entropy-decoding the first plural packets, the second plural packets, the third plural packets, and the fourth plural packets in parallel. The first plural packets, the second plural packets, the third plural packets, and the fourth plural packets may be entropy-decoded in parallel by the first entropy decoder engine, the second entropy decoder engine, the third entropy decoder engine, and the fourth entropy decoder engine, respectively. The first plural packets may include packet 0, packet 1, and packet 6, the second plural packets may include packet 2, packet 3, and packet 7, the third plural packets may include packet 4 and packet 8, and the fourth plural packets may include packet 5 and packet 9.

The parallel entropy decoding may include parallel entropy decoding performed on packets 0 and 1 by the first entropy decoder engine, packets 2 and 3 by the second entropy decoder engine, packet 4 by the third entropy decoder engine, and packet 5 by the third entropy decoder engine, and parallel entropy decoding performed on packet 6 by the first entropy decoder engine, packet 7 by the second entropy decoder engine, packet 8 by the third entropy decoder engine, and packet 9 by the fourth entropy decoder engine.

Packets 0 and 1 may include code groups corresponding to a left half of a first line of the current precinct, packets 2 and 3 may include code groups corresponding to a left half of a second line of the current precinct, packet 4 may include code groups corresponding to a right half of the first line of the current precinct, packet 5 may include code groups corresponding to a left half of a third line of the current precinct, packet 6 may include code groups corresponding to a right half of the third line of the current precinct, packet 7 may include code groups corresponding to a right half of the second line of the current precinct, packet 8 may include code groups corresponding to a left half of a fourth line of the current precinct, and packet 9 may include code groups corresponding to a right half of the fourth line of the current precinct.

Each entropy decoder engine may be configured to output one code group at every clock in a pipeline manner based on a clock signal.

One code group may include 4 quantization index information, and the quantization index information may indicate quantized wavelet coefficient information.

The entropy decoding may include obtaining residual information from a bitplane count subpacket of a packet including a current code group, obtaining a predictor based on bitplane count information of a higher line of the current code group, and obtaining bitplane count information of the current code group based on the residual information and the predictor.

The residual information may be obtained based on a lookup table including a variable length code.

The lookup table may include a 32×1 multiplexer.

The entropy decoding may further include obtaining sign information and quantization index magnitude information from the data subpacket of the packet including the current code group based on the bitplane count information of the current code group. The sign information may indicate a sign of wavelet coefficient information, and the quantization index magnitude information may indicate an absolute value of quantized wavelet coefficient information.

The entropy decoding may include obtaining quantization index magnitude information from a data subpacket including the current code group based on the bitplane count information of the current code group, and obtaining sign information from a sign subpacket including the current code group based on the quantization index magnitude information. The sign information may indicate a sign of wavelet coefficient information, and the quantization index magnitude information may indicate an absolute value of quantized wavelet coefficient information.

The device may further include an inverse quantizer configured to restore wavelet coefficient information by performing inverse quantization based on entropy-decoded data.

The device may further include an inverse transformer configured to restore a sample by performing inverse discrete wavelet transformation based on the wavelet coefficient information.

Advantageous Effects

According to the present disclosure, entropy decoding performance may be improved in proportion to the number of entropy decoder engines.

According to the present disclosure, the amount of data processed in each entropy decoder engine may be adjusted at a similar level, so that parallel processing may be more advantageously performed.

According to the present disclosure, since entropy decoding for bitplane count information of a higher (or previous) line may be completed before each entropy decoder engine entropy-decodes bitplane count information of a current line, bitplane count information which is encoded based on a vertical prediction mode may be efficiently processed in parallel.

The effects that may be achieved with the present disclosure are not limited to what has been particularly described hereinabove and other advantages not described herein will be more clearly understood by persons skilled in the art from the following detailed description of the present disclosure.

DESCRIPTION OF DRAWINGS

The accompanying drawings, which are included to provide a further understanding of the disclosure, illustrate the technical idea of the disclosure and together with the description serve to explain the principle of the disclosure.

BEST MODE FOR CARRYING OUT THE DISCLOSURE

The techniques below may be used in a video signal processing device configured to encode and/or decode a video signal. Although a video signal generally refers to a sequence of images or pictures that are perceivable by eyes, a video signal in this specification may be used to refer to a sequence of bits representing a coded picture. Further, in the present specification, a sequence of bits representing a coded picture may be referred to as a bitstream for a video signal and may be simplified to a bitstream or a video signal. "Bitstream" may be used interchangeably with "code stream".

A picture may refer to an arrangement of samples and may be used interchangeably with terms such as "frame" and "image". More specifically, the picture may refer to a two-dimensional arrangement of samples or a two-dimensional sample arrangement. In this specification, "picture" and "image" may be used interchangeably with each other. A sample may refer to a minimum unit constituting the picture and may be referred to as a pixel, a picture element, or a pel. The picture may include a luminance component and/or a color difference component. In this specification, the luminance component may be used interchangeably with terms such as "luma component", "luma signal", and "luma", and the color difference component may be used interchangeably with terms such as "chrominance component", "chroma component", "chrominance signal", "chroma signal", and "chroma". In this specification, coding may be used to refer to encoding or may collectively refer to encoding/decoding.

In this specification, a hexadecimal number is represented by adding a prefix "0x" to a value in order to distinguish the hexadecimal number from a decimal number. For example, 0xFF represents a 1-byte hexadecimal number having a value of FF.

While the present disclosure is described based on the JPEG-XS standard, the principles of the present disclosure are not limited to the JPEG-XS standard and may also be applied to other video compression techniques that are identical or similar to the JPEG-XS standard. In addition, while the present disclosure is described focusing on a decoding process, an encoding process may be performed in a reverse order of the decoding process described in this specification, and it will be understood that the encoding process may include steps corresponding to steps constituting the decoding process described herein.

Figure 1:
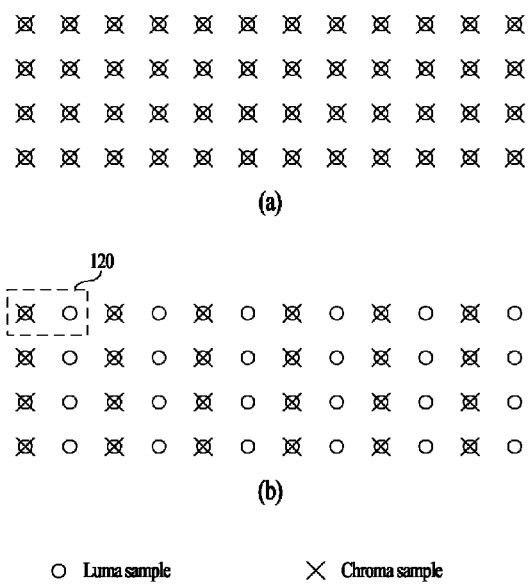
FIG. 1 illustrates a chroma subsampling format

FIG. 1 illustrates a chroma subsampling format. FIG. 1(*a*) illustrates a 444 format, and FIG. 1(*b*) illustrates a 422 format.

A picture may have an RGB color format and a YCbCr color format. The picture having the RGB color format includes a red (R) component, a green (G) component, and a blue (B) component and may be converted into the YCbCr color format for encoding/decoding. The picture having the YCbCr color format includes a luma component and two chroma components Cb and Cr. Since a conversion method between the RGB format and the YCbCr format is widely known in the field of an image processing technique, a detailed description thereof will be omitted herein.

Each of the components (the luma component and the chroma components) of the picture having the YCbCr format may be expressed in a two-dimensional arrangement of samples that are aligned along a sampling grid of a rectangle. The chroma component may have the same dimension as the luma component. However, since the human eye is less sensitive to the luma component than the chroma component, samples of the chroma component may be subsampled in order to reduce the amount of information of the chroma signal.

Referring to FIG. 1(*a*), a luma sample and a chroma sample may be sampled on the same sampling grid. In this case, a luma component and a chroma component of a picture may have the same dimension. This chroma subsampling format may be referred to as a 444 chroma subsampling format or a 444 format or may be referred to as a 4:4:4 chroma subsampling format or a 4:4:4 format.

Referring to FIG. 1(*b*), luma samples are sampled in the same manner as in FIG. 1(*a*), but 2:1 subsampling may be applied to samples of the chroma component in a horizontal direction. For example, the luma samples are sampled on two sample grids 120, but the chroma samples may be sampled only on a left grid of the two sample grids 120. Such a chroma subsampling format is referred to as a 422 chroma subsampling format or a 422 format or may be referred to as a 4:2:2 chroma subsampling format or a 4:2:2 format. When the 422 format is applied, a horizontal dimension of the chroma component of a picture is half a horizontal dimension of the luma component, whereas a vertical dimension of the chroma component is equal to a vertical dimension of the luma component.

Figure 2:
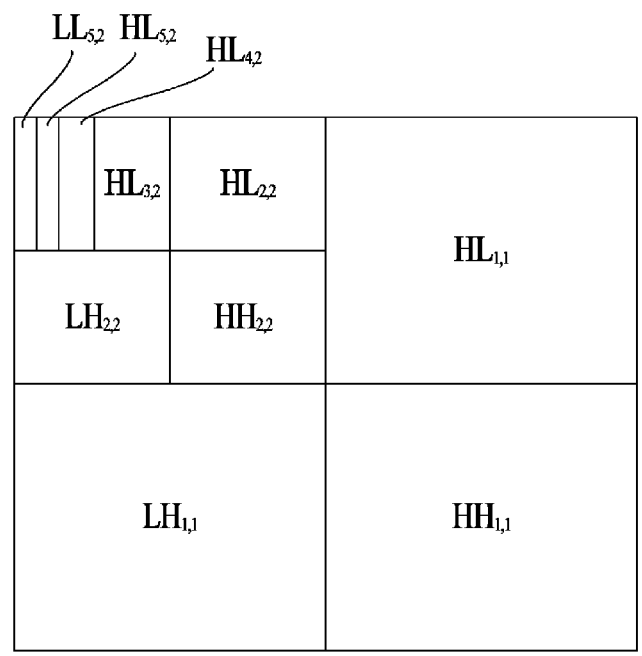
FIG. 2 illustrates a band generated by applying wavelet transformation.

FIG. 2 illustrates a band generated by applying wavelet transformation.

In the JPEG-XS standard, discrete wavelet transformation (DWT) is used for encoding, and inverse DWT is used for decoding. DWT refers to a process of decomposing an image into at least one high frequency band and at least one low frequency band by applying a low-pass filter and/or a high-pass filter to samples of an image in a horizontal direction and/or a vertical direction and may be simply referred to as wavelet transformation or conversion in this specification. The low-pass filter and/or the high-pass filter applied for wavelet transformation may be referred to as a wavelet filter. A result generated by performing wavelet transformation on samples constituting an image in the spatial domain is referred to as wavelet coefficient information. In this specification, the wavelet coefficient information may be used interchangeably with terms such as "transformation coefficient information", "wavelet coefficient", and "transformation coefficient".

Inverse DWT refers to a process of restoring samples of an image or composing the samples into one band by interleaving at least one high frequency band and at least one low frequency band and then applying a wavelet filter and may be simply referred to as inverse wavelet transformation or inverse transformation in this specification. The same wavelet filter may be used for transformation and inverse transformation.

In the JPEG-XS standard, an image may be horizontally decomposed into 2 to 6 bands by applying wavelet transformation one to five times in a horizontal direction and may be vertically decomposed into 1 to 3 bands by applying wavelet transformation zero to two times in a vertical direction. How many times an image is decomposed into bands by applying a wavelet filter in a horizontal direction or in a vertical direction is referred to as a decomposition level or a decomposition depth.

Referring to FIG. 2, a result of 5-level horizontal decomposition and 2-level vertical decomposition for an image through wavelet transformation is illustrated. In the example of FIG. 2, H refers to a high frequency band generated by applying a wavelet filter, L refers to a low frequency band generated by excluding the high frequency band, and a subscript refers to a decomposition level. The first character of the subscript represents a horizontal direction, and the second character of the subscript represents a vertical direction.

For example, an encoder may decompose an original image into an $LH_{0,1}$ band an $LL_{0,1}$ band by applying vertical wavelet transformation to the original image, decompose the $LL_{0,1}$ band into an $LL_{1,1}$ band and an $HL_{1,1}$ band by applying horizontal wavelet transformation to the $LL_{0,1}$ band, and decompose the $LL_{0,1}$ band into an $LL_{1,1}$ band and an $HH_{1,1}$ band by applying horizontal wavelet transformation to the $LL_{0,1}$ band. Similarly, the encoder may decompose the $LL_{1,1}$ band into an $LH_{1,2}$ band and an $LL_{1,2}$ band by applying vertical wavelet transformation to the $LL_{1,1}$ band, decompose the $LL_{1,2}$ band into an $LL_{2,2}$ band an $HL_{2,2}$ band by applying horizontal wavelet transformation to the $LL_{1,2}$ band, and decompose the $LH_{1,2}$ band into an $LH_{2,2}$ band and an $HH_{2,2}$ band by applying horizontal wavelet transformation to the $LH_{1,2}$ band. The encoder may decompose the $LL_{2,2}$ band into an $HL_{3,2}$ band and an $LL_{3,2}$ band by applying horizontal wavelet transformation to the $LL_{2,2}$ band. Similarly, the encoder may decompose the $LL_{3,2}$ band into an $HL_{4,2}$ band an $LL_{4,2}$ band by applying horizontal wavelet transformation to the $LL_{3,2}$ band and decompose the $LL_{4,2}$ band into an $HL_{5,2}$ band an $LL_{5,2}$ band by applying horizontal wavelet transformation to the $LL_{4,2}$ band A decoder may compose bands in a reverse order of the above-described process to restore samples of the spatial domain from wavelet coefficients of the frequency domain.

As illustrated in FIG. 2, the dimension of a band generated by applying wavelet transformation may be half of the dimension of an original image or a previous band. Accordingly, the dimension of all bands formed by concatenating each band in the frequency domain (i.e., the number of wavelet coefficients constituting the width and height of all bands) may be the same as the dimensions of an image in the spatial domain (i.e., the number of samples constituting the width and height of the image).

In addition, one row of wavelet coefficients in the $LL_{5,2}$ band, the $HL_{5,2}$ band, the $HL_{4,2}$ band, the $HL_{3,2}$ band, the $HL_{2,2}$ band, the $LH_{2,2}$ band, the $HH_{2,2}$ band may correspond to four rows of samples in the spatial domain. Two rows of wavelet coefficients in the $HL_{1,1}$ band, the $LL_{1,1}$ band, and the $HH_{1,1}$ band may correspond to the two equal rows of samples in the spatial domain. In other words, one row of the wavelet coefficients in the $LL_{5,2}$ band, the $HL_{5,2}$ band, the $HL_{4,2}$ band, the $HL_{3,2}$ band, the $HL_{2,2}$ band, the $LH_{2,2}$ band, the $HH_{2,2}$ band, and two rows of the wavelet coefficients in the $HL_{1,1}$ band, the $LH_{1,1}$ band, and the $HH_{1,1}$ band may contribute to restoring the same spatial region. The spatial region refers to a region of samples having a particular dimension in the spatial domain.

Figure 3:
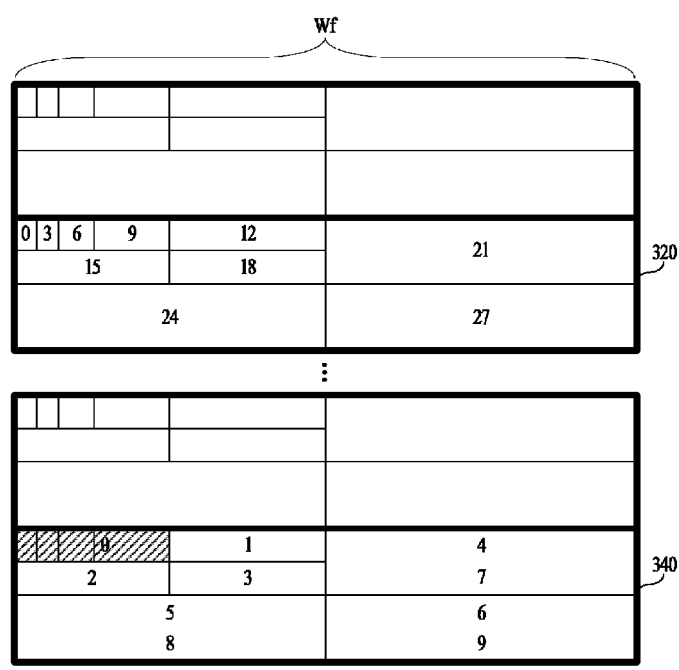
FIG. 3 illustrates a precinct.

FIG. 3 illustrates a precinct.

As described above, the wavelet coefficient information generated by wavelet transformation may be grouped in the frequency domain in a precinct unit. A precinct refers to a collection of wavelet coefficients of all bands that contribute to (restoration of) a particular spatial region of an image. The width of the precinct may be set to be equal to the width of the image or may be set to multiples of 8. Information indicating the width of the precinct may be included in a picture header of a bitstream (e.g., refer to FIG. 6), and the decoder may identify the width of the precinct by parsing the picture header.

Referring to FIG. 3, bold lines represent boundaries of the precinct, and thin lines represent boundaries of bands constituting the precinct. While it is assumed in the example of FIG. 3 that the width of the precinct is set to be equal to a width Wf of an image, the present disclosure is not limited thereto.

First, for convenience of description, a band index is defined. A wavelet filter type β may be assigned to each of bands, and an index of each of the bands may be given based on the wavelet filter type β. For example, Table 1 lists wavelet filter types for the bands illustrated in FIG. 2, and an index of each band may be given based on Equation 1.

TABLE 1

| Wavelet filter type β | Wavelet filtering and decomposition depths |
| --- | --- |
| 0 | $LL_{5,2}$ |
| 1 | $HL_{5,2}$ |
| 2 | $HL_{4,2}$ |
| 3 | $HL_{3,2}$ |
| 4 | $HL_{2,2}$ |
| 5 | $LH_{2,2}$ |
| 6 | $HH_{2,2}$ |
| 7 | $HL_{1,1}$ |
| 8 | $LH_{1,1}$ |
| 9 | $HH_{1,1}$ |

$$b = N_c \times \beta + i \qquad \text{[Equation 1]}$$

In Equation 1, b denotes a band index, Nc denotes the number of components of an image, and i denotes a component index. For example, when an image has a YCbCr format, then Nc may be 3, the index of a Y component may be 0, the index of a Cb component may be 1, and the index of a Cr component may be 2. Therefore, bands for the Y component may have indexes of 0, 3, 6, 9, 12, 15, 18, 21, 24, and 27, and bands for the Cb component may have indexes of 1, 4, 7, 10, 13, 16, 19, 22, 25, and 28, and bands for the Cr component may have indexes of 2, 5, 8, 11, 14, 17, 20, 23, 26, and 29.

As described above, since one row of the wavelet coefficients in the $LL_{5,2}$ band, the $HL_{5,2}$ band, the $HL_{4,2}$ band, the $HL_{3,2}$ band, the $HL_{2,2}$ band, the $LH_{2,2}$ band, the $HH_{2,2}$ band and two rows of the wavelet coefficients in the $HL_{1,1}$ band, the $LH_{1,1}$ band, and the $HH_{1,1}$ band may contribute to restoring the same spatial region, one precinct 320 in FIG. 3 may include one row of wavelet coefficients from bands 0, 3, 6, 8, 12, 15, and 18 and two rows of wavelet coefficients from bands 21, 24, and 27.

Wavelet coefficients of each precinct may be entropy-encoded in packet units through quantization. More specifically, data entropy-encoded from the precinct may be grouped into one or more packets for each band and line of the precinct. For example, Table 2 illustrates the relationship between packets, lines, and bands.

TABLE 2

| Packet index | Line number | Included bands |
|---|---|---|
| 0 | 0 | (0, 1, 2) (3, 4, 5) (6, 7, 8) (9, 10, 11) |
| 1 | 0 | (12, 13, 14) |
| 2 | 1 | (15, 16, 17) |
| 3 | 1 | (18, 19, 20) |
| 4 | 0 | (21, 22, 23) |
| 5 | 2 | (24, 25, 26) |
| 6 | 2 | (27, 28, 29) |
| 7 | 1 | (21, 22, 23) |
| 8 | 3 | (24, 25, 26) |
| 9 | 3 | (27, 28, 29) |

Referring to FIG. 3 based on Table 2, (entropy-encoded) data for one precinct 340 is included in ten packets, i.e., packet 0 to packet 9. More specifically, the (entropy-encoded) data for bands 0, 3, 6, and 9 (refer to an oblique line part) constituting one precinct 340 is included in one packet (packet 0). Further, (entropy-encoded) data for band 12 is included in one packet, i.e., packet 1, (entropy-encoded) data for band 15 is included in one packet, i.e., packet 2, and (entropy-encoded) data for band 18 is included in one packet, i.e., packet 3. In addition, (entropy-encoded) data for band 21 may be included in two packets per line, i.e., packet 4 and packet 7, (entropy-encoded) data for band 24 may be included in two packets per line, i.e., packets 5 and 8, and (entropy-encoded) data for band 27 may be included in two packets per line, i.e., packets 6 and 9.

In addition, based on Table 2, (entropy-coded) data for a chroma component band may also be included in a corresponding packet.

Figure 4:
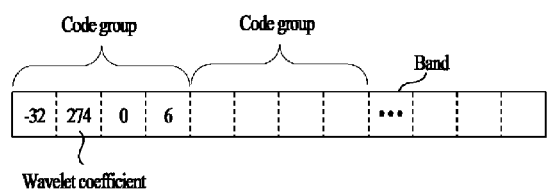
FIG. 4 illustrates a code group.

FIG. 4 illustrates a code group.

A plurality of consecutive wavelet coefficients in one line of a precinct may be grouped so that quantization and entropy coding may be performed on a group basis. A group of such wavelet coefficients is referred to as a code group. Quantized wavelet coefficients may be generated by performing quantization on wavelet coefficients of the code group. The quantized wavelet coefficients are referred to as quantization indexes and may be referred to as quantization index information, quantized wavelet coefficient information, or quantized transformation coefficient information in this specification. A group of quantization indexes to which quantization is applied may also be referred to as the code group. As an example, without being limited thereto, one code group may include four wavelet coefficient information or quantization index information.

Referring to FIG. 4, for example, wavelet coefficients included in one line of a particular band are illustrated. Plural (e.g., four) consecutive wavelet coefficients may be grouped from the start of the line to form a code group. Specifically, in the example of FIG. 4, one line included in a particular band may continuously include wavelet coefficients −32, 274, 0, 6, . . . from the beginning. These four wavelet coefficients may be grouped into one group to perform quantization and entropy encoding.

Figure 5:
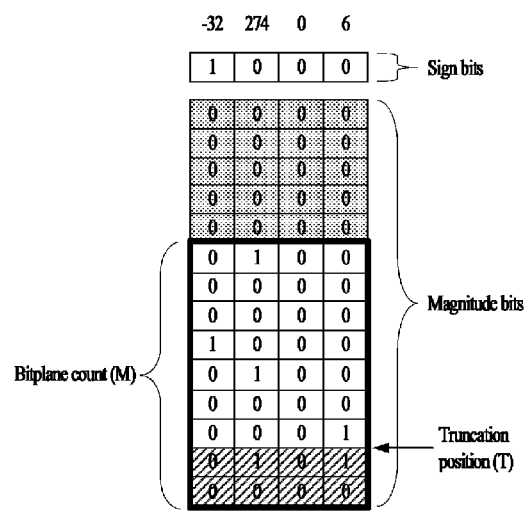
FIG. 5 illustrates a bitplane.

FIG. 5 illustrates a bitplane.

Wavelet coefficient information may be expressed as sign information and magnitude information. The sign information indicates a sign of the wavelet coefficient information. As an example, without being limited thereto, if the sign information has a value of 1, this may indicate that a wavelet coefficient has a negative sign and, if the sign information has a value of 0, this may indicate that a wavelet coefficient has a positive sign. The magnitude information represents an absolute value of a wavelet coefficient.

An arrangement of bits in the same bit position in a code group is referred to as a bitplane. Information indicating the number of bitplanes from the least significant bitplane to a non-zero most significant bitplane is referred to as bitplane count information (referred to as "M information" for convenience) and may be simply referred to as a bitplane count.

Referring to FIG. 5, a bitplane for wavelet coefficients included in the code group illustrated in FIG. 4 is illustrated. In the example of FIG. 5, it is assumed that magnitude information of a wavelet coefficient is represented as 16 bits, sign information of a wavelet coefficient is represented as one bit, and two least significant bits are truncated by quantization. However, this is purely exemplary and the present disclosure is not limited thereto. Since one code group includes four wavelet coefficients −32, 274, 0, and 6, bitplanes from 9 to 15 are all 0, and the non-zero most significant bitplane is in the 9th bit position (i.e., bitplane 8). Thus, in the example of FIG. 5, the value of M information may be set to 9.

In addition, information indicating the number of least significant bitplanes truncated from wavelet coefficients by quantization is referred to as truncation position information (referred to as "T information" for convenience). For example, the T information may be set to values of 0 to 15. In the example of FIG. 5, since it is assumed that two least significant bits are truncated by quantization, bit 0 and bit 1 may be truncated, and the value of the T information may be set to 2. The T information may be encoded based on band priority information transmitted through a weight table (e.g., refer to FIG. 9) (referred to as "P information" for convenience), precinct quantization information transmitted through a precinct header (refer to FIG. 6) (referred to as "Q information" for convenience), and precinct refinement threshold information (referred to as "R information" for convenience).

A plurality of consecutive code groups may be grouped into one significance group. Information indicating whether each significance group includes a non-zero code group may be signaled through a bitstream, and this information is referred to as significance flag information (referred to as "Z information" for convenience). For example, if the Z information has a value of 0, this may indicate that a corresponding significance group includes at least one non-zero code group and, if the Z information has a value of 1, this may indicate that all code groups in a corresponding significance group are zero. As an example, without being limited thereto, one significance group may include 8 code groups.

Like a wavelet coefficient, a quantization index may be expressed as sign information and magnitude information. The sign information is set to be equal to the sign information of the wavelet coefficient. As an example, without being limited thereto, if the sign information has a value of 1, this may indicate that a quantization index has a negative sign and, if the sign information has a value of 0, this may indicate that a quantization index has a positive sign. The magnitude information may indicate an absolute value of a quantized wavelet coefficient and may be expressed as up to 16 bits. The magnitude information may be referred to as quantization index magnitude information or a quantization index magnitude.

The JPEG-XS standard supports two types of quantization, i.e., deadzone quantization and uniform quantization. To this end, information indicating a used quantization type (for encoding) among the deadzone quantization and the uniform quantization (referred to as "Qpih information" for convenience) may be included in a picture header (e.g., refer to FIG. 6). For example, the deadzone quantization may be implemented as an operation of representing a wavelet coefficient as sign information and magnitude information and right-shifting the magnitude information by a value of T information. For example, the deadzone quantization may be performed based on Equation 2. In Equation 2, v denotes a quantization index magnitude, d denotes magnitude information of a wavelet coefficient, and T denotes truncation position information.

$$v = d >> T \qquad \text{[Equation 2]}$$

The uniform quantization may be implemented as an operation of dividing the magnitude information of a wavelet coefficient by a quantization step size $$\Delta = \frac{2^{M+1}}{2^{M+1-T} - 1}$$

and then rounding the divided result. For example, the uniform quantization may be performed based on Equation 3. In Equation 3, v denotes a quantization index magnitude, d denotes magnitude information of a wavelet coefficient, M denotes bitplane count information, and T denotes truncation position information.

$$v = ((d << \zeta) - d + (1 << M)) >> (M + 1), \zeta = M - T + 1 \qquad \text{[Equation 3]}$$

The quantization index magnitude information and sign information generated by quantization may be added to a bitstream through entropy encoding.

Figure 6:
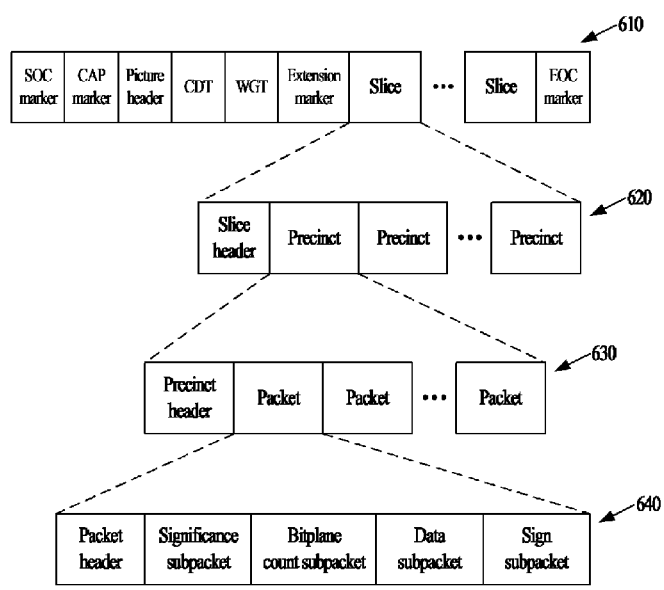
FIG. 6 illustrates a bitstream in accordance with a JPEG-XS standard.

FIG. 6 illustrates a bitstream in accordance with a JPEG-XS standard.

A bitstream generated when one image is encoded according to the JPEG-XS standard may include syntax information 610, 620, 630, and 640 illustrated in FIG. 6. Since a video signal may include a plurality of images, when each image is encoded according to the JPEG-XS standard, a bitstream formed by concatenating the bitstream illustrated in FIG. 6 may be generated. In FIG. 6, syntax information distinguished by lines may be aligned in units of bytes. Thus, when corresponding syntax information is not aligned in bytes during encoding, a padding bit or a filler bit may be added for byte alignment. For example, 0 may be added to the last of the corresponding syntax information as the padding bit or the filler bit.

A start of codestream (SOC) marker indicates syntax information for identifying that a bitstream is based on the JEPG-XS standard and indicates the start of a bitstream for one picture. For example, the SOC marker may have a length of 2 bytes and have a value of 0xFF10. An end of codestream (EOC) marker indicates information for identifying the end of a bitstream and indicates the end of a bitstream for one picture. For example, the SOC marker may have a length of 2 bytes and have a value of 0xFF11. A decoder may identify the start and end of the bitstream for one picture based on the SOC marker and the EOC marker.

A capability marker (or CAP marker) is information for identifying capability required to decode a bitstream in accordance with JPEG-XS. The current standard does not define a capability value, and the CAP marker may include a value of 0xFF50 of 2 bytes.

A picture header includes information about the dimensions of an image, information about a component of an image, and information for the configuration of the decoder. Specifically, the picture header may include a marker for identifying the picture header (e.g., 0xFF12 of a 2-byte length), information indicating the width of the image (by the number of samples), information indicating the height of the image (by the number of samples), and information indicating the number of components in the image. The picture header may also include information indicating the width of a precinct, information indicating a quantization type (or Qpih information), information indicating whether sign information is encoded together with a data subpacket or separately encoded in a sign subpacket (referred to as "Fs information" for convenience, information indicating whether to perform inverse multiple component transformation (referred to as "Cphi information" for convenience), and information indicating the number of bits for bitplane count information (referred to as "Br information" for convenience).

A component table (CDT) includes specific information for components constituting an image. Specifically, the component table may include a marker for identifying the start of the component table (e.g., 0xFF13), information indicating bit precision of each component, information indicating a horizontal subsample factor of each component (referred to as "Sx" for convenience), and information indicating a vertical subsampling factor of each component (referred to as "Sy" for convenience). Bit precision refers to the number of bits required to represent one sample. As an example without limiting the present disclosure, when Sx and Sy have values of 1, this indicates 1:1 subsampling and, when Sx and Sy have values of 2, this indicates 2:1 subsampling. Thus, for the 444 format (e.g., refer to FIG. 1(a)), Sx and Sy may have values of 1 for all components. For the 422 format (e.g., refer to FIG. 1(b)), Sy may have a value of 1 for all components, but Sx may have a value of 1 for a luma component and a value of 2 for a chroma component.

A weight table (or WDT) includes parameters necessary to set gain of each band in relation to quantization and inverse quantization of a precinct. More specifically, the weight table may include a marker for identifying the start of the weight table (e.g., 0xFF14), information indicating gain of each band, and information indicating priority of each band (or P information). Parameters included in the weight table are used to perform quantization and inverse quantization of wavelet coefficients of each band together with parameters (e.g., Q information and R information) of a precinct header.

An extension marker may include generic metadata or vendor-specific metadata together with a marker (e.g., 0xFF15) for identifying the start of the extension marker.

A slice may refer to a unit capable of performing coding independently of another portion of an image and includes a wavelet coefficient necessary to reconstruct a horizontal stripe in the image. The horizontal stripe refers to an area including one or more rows in the image. The slice may include one or more precincts. Within a bitstream, the slice may be represented by a slice header and an integer number of precincts 620.

The slice header may include a marker for identifying the start of a corresponding slice (e.g., 0xFF20), information indicating the size of the slice header (e.g., the number of bytes) (referred to as "Lslh information" for convenience), and information indicating an index of a corresponding slice in an image. The index of the slice represents the order of a slice constituting the image, and index values may be allocated in ascending order starting from 0 from an upper end of the image to a lower end of the image.

A precinct refers to a collection of wavelet coefficients of all bands that contribute to a particular spatial region of an image, and (entropy-encoded) data for the precinct may be included in one or more packets (e.g., refer to FIG. 3 and a related description). Within a bitstream, a precinct may be represented by a precinct header and an integer number of packets 630.

The precinct header may include information indicating the size of (entropy-encoded) data (e.g., the number of bytes) included in the precinct 630 (referred to as "Lprc information" for convenience), information necessary to obtain truncation position information (or T information, refer to FIG. 5 and a related description) of the precinct 630 (e.g., Q information and R information), and information indicating a coding mode of a bitplane count for each band (referred to as "D information" for convenience). The Lprc information indicates, as the number of bytes, the size of (entropy-encoded) data from the end of the precinct header until the next precinct header, a slice header or an EOC marker. The D information consists of two bits, a higher bit of which indicates whether significance coding is used and a lower bit of which indicates a bitplane count coding mode.

Significance coding refers to a process of grouping plural (e.g., 8) code groups to form a significance group and generating Z information (or significance flag information, refer to FIG. 5 and a related description) for each significance group to add the Z information to a bitstream through a significance subpacket. For example, if a higher bit of the D information is 1, this indicates that significance coding is used, and each packet in a bitstream includes the significance subpacket. On the other hand, if the higher bit of the D information is 0, this indicates that no significance coding is used, and each packet in the bitstream does not include the significance subpacket.

The bitplane count coding mode refers to a mode for coding M information (or bitplane count information, refer to FIG. 5 and a related description) and may include a raw mode, a no prediction mode, and a vertical prediction mode. In the vertical prediction mode, M information of a higher line of a line including a current code group in a current precinct is used as a predictor (or a predicted value) and residual information between M information of a current code group and the predictor is encoded in a bitplane count subpacket. In the vertical prediction mode, the residual information may be encoded using a variable length code.

In the no prediction mode, residual information of the M information of a current code group is obtained using T information, instead of the M information of a higher line, as the predictor, and the residual information is encoded in the bitplane count subpacket. As an example, without being limited thereto, if a lower bit of the D information is 0, this may indicate the no prediction mode and, if the lower bit of the D information is 1, this may indicate the vertical prediction mode. In the no prediction mode, the residual information may be encoded using a variable length code.

In the raw mode, the M information in an image may be encoded to a fixed number of bits, and information indicating the number of bits (referred to as "Br information" for convenience) may be included in a picture header (e.g., refer to FIG. 6). The raw mode may be determined according to override flag information (or Dr information below) signaled through a packet header. For example, if the Dr information is 1, the raw mode may be applied and, if the Dr information is 0, the bitplane count coding mode may be determined according to the D information.

A packet includes data that quantizes and entropy-encodes wavelet coefficients included in one line in one or more bands within a precinct (e.g., refer to the precinct 340 and packets 0 to 9 of FIG. 3). The packet may be expressed as a packet header and a plurality of subpackets in a bitstream, and the subpackets may include at least one of a significance subpacket, a bitplane count subpacket, a data subpacket, and a sign subpacket 640.

The packet header may include override flag information (referred to as "Dr information" for convenience) additionally indicating a coding mode of bitplane count information, information indicating the size of the data subpacket (e.g., the number of bytes) (referred to as "Ldat information" for convenience), information indicating the size of the bitplane count subpacket (e.g., the number of bytes) (referred to as "Lent information" for convenience), and information indicating the size of a sign subpacket (e.g., the number of bytes) (referred to as "Lsgn information" for convenience). The Dr information indicates whether the raw mode is applied to M information of a code group included in a packet. The Lsgn information is included in the packet header regardless of Fs information described below but may be ignored according to the value of the Fs information. However, even when significance coding is used, information indicating the size of a significance subpacket is not included in the packet header, and size information of the significance subpacket may be obtained from the size of a band and a line constituting the packet.

As described above, the significance subpacket may be included in the packet when significance coding is used. The significance subpacket may include Z information (or significance flag information) for each significance group of the packet.

The bitplane count subpacket may include M information (or bitplane count information, refer to FIG. 5 and a related description) for each code group. As described above, the bitplane count subpacket may include a variable length code (a vertical prediction mode or a no prediction mode) representing residual information for each M information or include a fixed length code (a raw mode) representing the M information, according to the bitplane count coding mode.

The data subpacket may include sign information and quantization index magnitude information for a corresponding code group. The quantization index magnitude information is encoded in the data subpacket. The sign information may be encoded in the data subpacket together with the quantization index magnitude information or may be encoded in the sign subpacket separately from the quantization index magnitude information. Information (or Fs information) indicating whether the sign information is encoded together with the data subpacket or is separately encoded in the sign subpacket may be included in a bitstream (e.g., a picture header). For example, if the value of the Fs information is 0, this indicates that the sign information is encoded in the data subpacket, and the sign subpacket is not included in the bitstream. On the other hand, if the value of the Fs information is 1, this indicates that the sign information is not encoded in the data subpacket and is separately encoded in the sign subpacket, and the sign subpacket is included in the bitstream.

If the sign information is separately encoded in the sign subpacket, the sign information may be encoded based on the quantization index magnitude information of the data subpacket. For example, if the quantization index magnitude information has a non-zero value, this indicates that one sign bit is encoded in the sign subpacket and, if the quantization index magnitude information has a value of 0, this indicates that the sign bit is not encoded in the sign subpacket.

Figure 7:
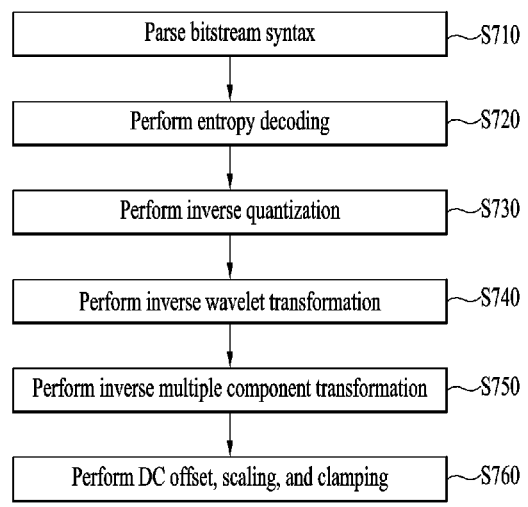
FIG. 7 illustrates a flowchart of a method of decoding a bitstream for a video signal.

FIG. 7 illustrates a flowchart of a method of decoding a bitstream for a video signal. The method of FIG. 7 may be performed by a decoding device 10 (e.g., refer to FIG. 14). As mentioned above, the bitstream for the video signal may be simply referred to as a bitstream or a video signal, and the bitstream may be used interchangeably with a code stream. The bitstream for the video signal may include, for example, at least one bitstream described with reference to FIG. 6.

In step S710, the decoding device receives a bitstream and parses the bitstream to obtain syntax information. For example, the decoding device may parse the bitstream to obtain the syntax information and (entropy-coded) data 610, 620, 630, and 640 described with reference to FIG. 6. As described above, the decoding device may identify the start of the bitstream based on the SOC marker (e.g., 0xFF10) and identify the start of each slice in the bitstream based on the marker (e.g., 0xFF20) included in a slice header.

The decoding device may also obtain Lslh information (e.g., refer to FIG. 6 and a related description) in a slice header to identify the end of the slice header and the start of a precinct. After identifying the start of the precinct, the decoding device may obtain Lprc information (e.g., refer to FIG. 6 and a related description) from a precinct header to identify the end of the precinct and the start of the next precinct. Since syntax information of the precinct header has a constant magnitude, information indicating the size of the precinct header is not separately included in the bitstream. Thus, the decoding device may determine (or infer) the size of the precinct header based on the number of bands constituting the precinct. Based on the determined size of the precinct header, the decoding device may identify the start of a packet in the bitstream.

After identifying the start of the packet, the decoding device may parse a packet header to obtain Dr information, Ldat information, Lcnt information, and Lsgn information (e.g., refer to FIG. 6 and a related description). Information indicating the size of the packet header is also not separately included in the bitstream. Since the length of each syntax information of the packet header is predefined, the decoding device may identify the start of a subpacket based on the length of the syntax information.

As described above, the significance subpacket is included in the bitstream when significance coding is applied (e.g., refer to FIG. 6 and a related description). Specifically, the decoding device obtains the significance subpacket from the bitstream when significance coding is applied, and skip decoding of the significance subpacket when significance coding is not applied. Information about the size of the significance subpacket is not separately included in the bitstream, and the decoding device may determine (or infer) the size of the significance subpacket from the number of bands and the size of a line. Based on the determined size of the significance subpacket, the decoding device may obtain the significance subpacket (if the significance subpacket is present) and identify the start of a bitplane count subpacket.

The decoding device may obtain the bitplane subpacket from the bitstream and identify the start of a data subpacket, based on Lent information from the start of the identified bitplane count subpacket.

The decoding device may obtain the data subpacket from the bitstream (if the sign subpacket is present) and identify the start of a sign subpacket, based on the Ldat information from the start of the identified data subpacket.

If the sign subpacket is present according to Fs information (e.g., if the value of the Fs information is 1), the decoding device obtains the sign subpacket from the bitstream, based on the Lsgn information from the start of the identified sign subpacket.

After fully parsing one packet, the decoding device may parse the next packet in a byte boundary in the same manner as described above. The number of packets included in one precinct may be predefined based on a vertical decomposition level. For example, as described with reference to FIG. 3, when two-level vertical decomposition is applied, one precinct may be encoded into 10 packets, and the 10 packets may be included after a precinct header in the bitstream. As another example, if one-level vertical decomposition is applied, one precinct may be encoded into 4 packets and the 4 packets may be included after the precinct header in the bitstream. Thus, the decoding device may parse the precinct header and then obtain as many packets as a predefined number of packets from the bitstream. After obtaining a predefined number of packets, the decoding device may parse the next precinct, the next slice, or an EOC marker (e.g., 0xFF11).

Upon obtaining the EOC marker from the bitstream, the decoding device may terminate syntax parsing for a current image.

In step S720, the decoding device may perform entropy decoding based on the (entropy-coded) data obtained in step S710. Specifically, the decoding device may perform entropy decoding on the (entropy-coded) data (e.g., packets) to obtain entropy-decoded data (e.g., a code group constituting a precinct). The entropy decoding process will be described in detail with reference to FIG. 8.

In step S730, the decoding device may perform inverse quantization based on the entropy-decoded data (e.g., code group) in step S720 to recover wavelet coefficient information. Specifically, the decoding device may obtain Qpih information (e.g., refer to FIG. 6 and a related description) from the bitstream (e.g., picture header) to determine an inverse quantization type and then perform inverse quantization (e.g., refer to Equations 2 and 3 and a related description) of the determined type to restore a wavelet coefficient from quantization index magnitude information and sign information.

If inverse deadzone quantization is applied based on the Qpih information, the decoding device may left-shift quantization index magnitude information of a code group by the value of T information (or truncation position information), restore the quantization index magnitude information to a middle point of a quantization step size, and then apply sign information to restore the wavelet coefficient. For example, inverse deadzone quantization may be performed based on Equation 4. In Equation 4, c denotes a restored wavelet coefficient, s denotes sign information, b denotes a quantization index magnitude, and T denotes truncation position information.

$$c = (1-2s) \times ((v << T) + r), r = (1 << T) >> 1 \quad \text{[Equation 4]}$$

If inverse uniform quantization is applied based on the Qpih information, the decoding device may obtain a quantization step size $$\Delta = \frac{2^{M+1}}{2^{M+1-T} - 1}$$

based on M information (or bitplane count information) and T information for a code group, multiply the quantization index magnitude information by the quantization step size, and then apply sign information to restore the wavelet coefficient. For example, inverse uniform quantization may be performed based on Equation 5. In Equation 5, c denotes a restored wavelet coefficient, s denotes sign information, v denotes a quantization index magnitude, and T denotes truncation position information.

$$\psi = v << T \quad \text{[Equation 5]}$$
$$\zeta = M - T + 1$$
$$\text{for } (\rho = 0; \psi > 0; \psi = \psi >> \zeta) \{$$
$$\rho = \rho + \psi$$
$$\}$$
$$c = (1 - 2s) \times \rho$$

In step S740, the decoding device may perform inverse DWT based on the restored wavelet coefficient. Inverse DWT refers to a process of interleaving at least one high frequency band and at least one low frequency band and then applying a wavelet filter to recover image samples or compose the image samples into one band. In this specification, inverse DWT may be simply referred to as inverse wavelet transformation or inverse transformation.

Specifically, the decoding device may restore a precinct based on the wavelet coefficient restored in step S730, restore a band based on the precinct, and then perform inverse DWT based on the band to restore image samples. The decoding device may restore the band from the precinct in the inverse of the method of configuring the precinct at the encoder (e.g., refer to FIG. 3 and a related description) and restore samples of an image from the band in the reverse of the method of performing DWT at the encoder (e.g., refer to FIG. 2 and a related description). For inverse DWT, the decoding device may use the same wavelet filter as the wavelet filter used by the encoder.

In step S750, the decoding device may perform inverse multiple component transformation based on the restored image. Inverse multiple component transformation refers to an operation of transforming a color format. For example, inverse multiple component transformation may include an operation of transforming a YCbCr color format into an RGB color format. When an original image has the RGB color format, an encoding device may transform the color format into the YCbCr color format to perform encoding and encode Cpih information in the bitstream (e.g., picture header) (e.g., refer to FIG. 6 and a related description). For example, if the Cpih information has a value of 0, this may indicate that inverse multiple component transformation is not performed and, if the Cpih information has a value of 1, this may indicate that inverse multiple component transformation is performed.

The decoding device may obtain the Cpih information from the bitstream (e.g., picture header) and then determine whether to perform inverse multiple component transformation according to the Cpih information. If the Cpih information indicates that inverse multiple component transformation is performed, the decoding device may perform step S750 and, if the Cpih information indicates that inverse multiple component transformation is not performed, the decoding device may skip step S750.

In step S760, the decoding device may perform direct current (DC) offset, scaling, and clamping for each of samples of an image. The DC offset refers to an operation of shifting DC levels of image samples, scaling refers to an operation of scaling the range of values of the DC level shifted samples, and clamping refers to an operation of limiting the range of values of the scaled samples to a range of valid values.

If an SOC marker for the next image is obtained, steps S710 to S760 may be repeated for the next image.

Figure 8:
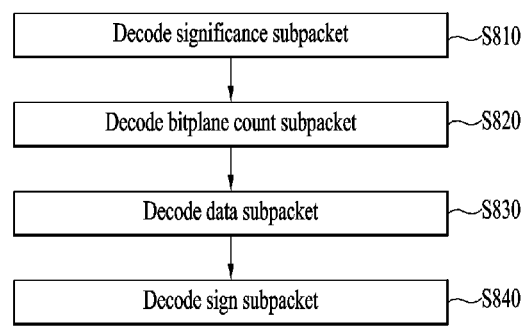
FIG. 8 illustrates a flowchart of an entropy decoding method.

FIG. 8 illustrates a flowchart of an entropy decoding method. The method illustrated in FIG. 8 may be performed in step S720 of FIG. 7 and may be performed by an entropy decoder engine 900, 1020, 1030, 1120, 1130, 1140, or 1150 included in the decoding device (e.g., refer to FIG. 14). Further, the method illustrated in FIG. 8 may be performed for each packet constituting a precinct (e.g., refer to FIG. 6 and a related description).

If significance coding is applied, a significance subpacket is present in a bitstream, and the decoding device may decode the significance subpacket (S810). Specifically, the decoding device may obtain Z information (or significance flag information) from the significance subpacket and restore wavelet coefficients constituting a significance group based on the Z information.

For example, if the Z information indicates that all code groups of the significance group are 0, the decoding device may restore wavelet coefficients corresponding to the significance group to 0 and skip steps S820 to S840. On the other hand, if the Z information indicates that a non-zero code group is included in the significance group, the decoding device may perform steps S820 to S840 for a code group included in a corresponding significance group to restore wavelet coefficients.

If significance coding is not applied, the decoding device skips step S810 and proceeds to step S820. Whether significance coding application is applied may be determined through a higher bit of D information of a precinct header (e.g., refer to FIG. 6 and a related description).

In step S820, the decoding device may decode a bitplane count subpacket. Specifically, the decoding device may determine a bitplane count coding mode based on D information obtained from a bitstream (e.g., a precinct header) and Dr information obtained from the bitstream (e.g., a packet header) (e.g., refer to FIG. 6 and a related description) and decode the bitplane count subpacket based on the determined bitplane count coding mode.

For example, when a raw mode is applied (e.g., when the Dr information indicates that the raw mode is applied), the decoding device may decode the bitplane count subpacket based on Br information obtained from the bitstream (e.g., packet header) to obtain M information (or bitplane count information).

As another example, when a no prediction mode is applied (e.g., when a lower bit of the D information indicates the no prediction mode), the decoding device may decode a variable length code from the bitplane count subpacket to obtain residual information and obtain M information based on the residual information.

As another example, when a vertical prediction mode is applied (e.g., when a lower bit of the D information indicates the vertical prediction mode), the decoding device may obtain a prediction value based on the M information of a higher (or previous) line of a line including a current code group, obtain residual information from a bitplane count subpacket of a packet including the current code group, and obtain M information of the current code group based on the prediction value and the residual information.

In addition, when significance coding is applied, the decoding device may obtain the M information based on the Z information obtained in step S810. Specifically, when the Z information indicates that all code groups of a significance group are 0, the decoding device may skip acquisition of the M information for all code groups of the corresponding significance group. On the other hand, if the Z information indicates that a non-zero code group is included in the significance group, the decoding device may decode the bitplane count subpacket to obtain the M information for code groups of the corresponding significance group.

If significance coding is not applied, the decoding device may sequentially decode/obtain the M information for all code groups of a packet.

In step 830, the decoding device may decode a data subpacket. As described above, the sign information of the quantization index may be encoded together with the data subpacket or encoded in the sign subpacket separately from the data subpacket, which may be indicated through Fs information (e.g., refer to FIG. 6 and a related description).

If the sign information is encoded together with the data subpacket (e.g., if the value of the Fs information is 0), the decoding device may decode the data subpacket to sequentially obtain the sign information by the number of quantization indexes (e.g., 4 indexes) included in a code group, and then obtain quantization index magnitude information by the number of quantization indexes (e.g., 4 indexes) included in the code group. In a bitstream, each quantization index magnitude information is composed of (M-T) bits and is packed in the order of a most significant bit (MSB) to a least significant bit (LSB) (M denotes the value of the M information for a corresponding code group and T denotes the value of the T information for a corresponding code group). Accordingly, the decoding device may obtain the (M-T) bits from the data subpacket and then arrange the obtained bits starting from the MSB to obtain the quantization index magnitude information.

If the sign information of the quantization index is separately encoded in the sign subpacket (e.g., if the value of Fs information is 1), the decoding device may omit parsing of sign information (e.g., 4 sign bits) for each code group and obtain the quantization index magnitude information by the number of quantization indexes (e.g., 4 indexes) included in the code group in the same manner as described above.

In step S840, the decoding device may decode the sign subpacket. Step S840 may be performed when the sign subpacket is present (e.g., when the value of the Fs information is 1). If the sign information of the quantization index is encoded in the sign subpacket, the sign information may be encoded only when the quantization index magnitude is not 0. For example, referring to the example of FIG. 5, if quantization is performed based on Equation 2 by assuming T=2 for the wavelet coefficients −32, 274, 0, and 6, then sign information 1, 0, 0, and 0 may be obtained and magnitude information 8, 68, 0, and 1 may be obtained. In this example, when the sign information is encoded in the sign subpacket, sign information 1, 0, and 0 only for quantization indexes having magnitude information 8, 68, and 1 is encoded in the sign subpacket, and encoding of sign information for a quantization index having magnitude information 0 is skipped.

Accordingly, the decoding device obtains the sign information from the sign subpacket based on the quantization index magnitude information obtained in step S830. Specifically, in step S840, the decoding device may obtain sign information when corresponding quantization index magnitude information is not 0 and skip parsing of the sign information when the corresponding quantization index magnitude information is 0.

Figure 9:
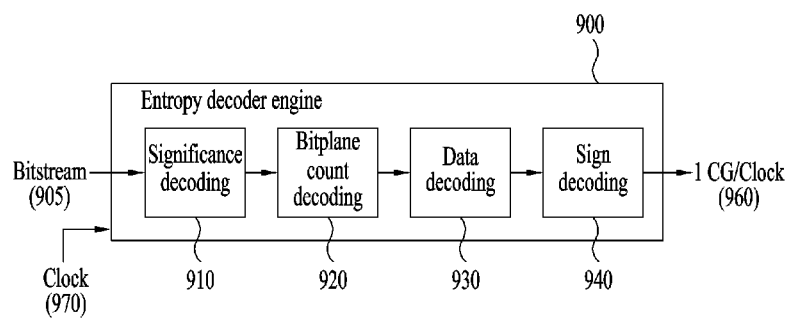
FIG. 9 illustrates the structure of an entropy decoder engine.

FIG. 9 illustrates the structure of an entropy decoder engine 900.

Referring to FIG. 9, the entropy decoder engine 900 may be configured to receive a bitstream 905 and perform entropy decoding to output a code group 960. For example, the entropy decoder engine 900 may be configured to perform an operation corresponding to the method described with reference to FIG. 8. The bitstream 905 may include, for example, the information described with reference to FIG. 6.

The entropy decoder engine 900 may be configured to perform entropy decoding in units of packets constituting a precinct in a bitstream. The entropy decoder engine 900 may be configured to sequentially perform significance decoding 910, bitplane count decoding 920, data decoding 930, and sign decoding 940. For example, the entropy decoder engine 900 may perform the operation described in step S810 of FIG. 8 for the significance decoding 910, perform the operation described in step S820 of FIG. 8 for the bitplane count decoding 920, perform the operation described in step S830 of FIG. 8 for the data decoding 930, and perform the operation described in step S840 of FIG. 8 for the sign decoding 940. For clarity of description, the entire description of FIG. 8 is incorporated by reference.

The entropy decoder engine 900 may also be configured in a pipelined manner to output one code group per clock based on a clock signal 970. For example, the operating clock 970 may be set to 480 MHz. In this case, the entropy decoder engine 900 may output up to 4.8 million code groups per second.

On the other hand, the JPEG-XS standard supports various resolutions, such as 2K (e.g., 1920×1080 or 2048×1080), 4K (e.g., 3840×2160 or 4096×2160), and 8K (e.g., 7680×4320 or 8192×4320) and supports various frame rates such as 30 Hz, 60 Hz, and 120 Hz. When wavelet transformation (e.g., refer to FIG. 2 and a related description) is applied, since as many wavelet coefficients as the number of picture resolutions are generated and grouped into a code group, the entropy decoder engine 900 needs to be designed to satisfy decoding performance according to a resolution and a frame rate of a video signal included in a bitstream.

For example, when a bitstream including a video signal of a YCbCr 444 format having a resolution of 3840×2160 and a frame rate of 120 Hz is entropy-decoded, the entropy decoder engine 900 may require hardware performance capable of outputting about 7.5 million (=3840×2160×120× ¾) code groups per second. In this example, assuming that the entropy decoder engine 900 performs an operation based on the clock 970 of 480 MHz, since the entropy decoder engine 900 may output a maximum of 4.8 million code groups per second, there may be a technical problem in that the entropy decoder engine 900 fails to decode, in real time, the bitstream including the video signal of the YCbCr 444 format having a resolution of 3840×2160 and a frame rate of 120 Hz.

In implementing the entropy decoder engine 900 as hardware, the most complex portion is the bitplane count decoding 920. Since the entropy decoder engine 900 operates in a pipeline manner, the performance of the most complex portion may affect the entire performance of the entropy decoder engine 900. Accordingly, the bitplane count decoding 920 may be configured to decode bitplane count information based on a lookup table including a variable length code in order to improve variable length code decoding performance. Since the bitplane count information from a minimum of one bit to a maximum of 32 bits may be allocated, the lookup table may include 32 variable length codes and may be implemented by a 32×1 multiplexer (MUX). Thus, a method of doubling entropy decoding performance by decoding bitplane count information for two code groups at a time based on the lookup table. However, when the bitplane count information for the two code groups is configured using the lookup table, since 1024 (=32×32) variable length code combinations are generated, a 1024×1 multiplexer may be required. In this case, since a hardware area required for implementation of the entropy decoder engine is remarkably increased, this method may not be desirable.

In addition, a method of increasing the clock signal 970 may be considered in order to solve the above technical problem. However, when the clock signal 970 is increased, a timing condition may not be satisfied when hardware is implemented. Further, since encoding/decoding techniques according to the JPEG-XS standard may be widely used for a mobile terminal, such as a smartphone, simply raising the operating clock 970 may not be desirable in terms of power consumption.

The present disclosure proposes an entropy decoding method and device based on parallel processing of packets. More specifically, the present disclosure proposes a method and device for processing packets included in one precinct in parallel by dividing the packets into packets corresponding to half of the width of the precinct. As described above, in the present disclosure, the precinct may refer to a collection of wavelet coefficient information of all bands that contribute to (restoration of) a particular spatial region of each picture constituting a video signal (e.g., refer to FIG. 3 and a related description) or refer to a portion of a bitstream that includes packets including these wavelet coefficient information (or a corresponding code group) (e.g., refer to 630 of FIG. 6).

The entropy decoder according to the present disclosure is configured to decode a bitstream for a video signal (or simply a bitstream or a video signal) including at least one precinct and may include a plurality of entropy decoder engines and a demultiplexer (DEMUX) for performing entropy decoding in parallel. Each of the plural entropy decoder engines may be operatively connected to the demultiplexer.

The demultiplexer according to the present disclosure may be configured to demultiplex packets (e.g., packet 0 to packet 9) of a precinct in a unit corresponding to half of one line in the precinct to transmit the demultiplexed packets to a plurality of entropy decoder engines. Half of one line corresponds to half of the width of the precinct. For example, if the width of one precinct is set to be equal to the width of a picture, half of one line corresponds to half of the width of the picture. Half of one line may consist of one packet (e.g., packet 4 to packet 9) and may consist of two packets (e.g., packets 0 and 1, and packets 2, and 3) (e.g., refer to FIG. 3 and a related description).

Each entropy decoder engine may entropy-decode the packets transmitted from the demultiplexers in a packet unit, and the plural entropy decoder engines may entropy-decode the packets transmitted from the demultiplexer in parallel. Each entropy decoder engine may have the structure 900 illustrated in FIG. 9 and perform the operations described with reference to FIG. 9 (e.g., operation corresponding to the method of FIG. 8). Each entropy decoder engine may be configured in a pipelined manner to output one code group per clock based on the clock signal 970.

The plural entropy decoder engines may also be configured to transmit and receive M information (or bitplane count information) for a code group so as to efficiently process a vertical prediction mode in parallel.

When entropy decoding is performed in parallel according to the present disclosure, technically advantageous effects may be expected. Specifically, according to the present disclosure, entropy decoding performance may be improved in proportion to the number of entropy decoder engines. In addition, according to the present disclosure, the amount of data processed in each entropy decoder engine may be adjusted at a similar level, so that parallel processing may be more advantageously performed. In addition, according to the present disclosure, since entropy decoding for bitplane count information of a higher (or previous) line may be completed before each entropy decoder engine entropy-decodes bitplane count information of a current line, bitplane count information which is encoded based on a vertical prediction mode may be efficiently processed in parallel (e.g., refer to S820 of FIG. 8 and a related description).

Figure 10:
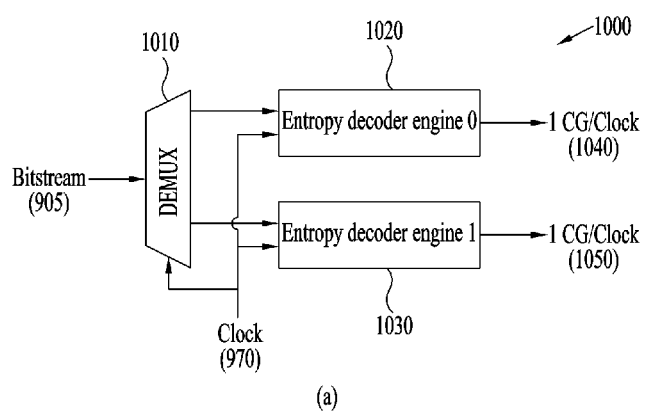
FIGS. 10 and 11 illustrate the structure of an entropy decoder according to the present disclosure.
Figure 10:
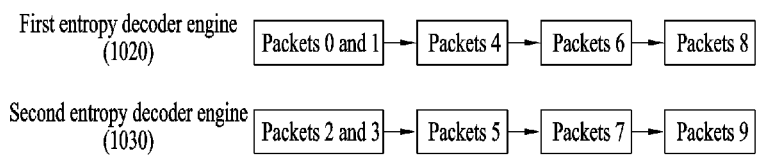
Figure 11:
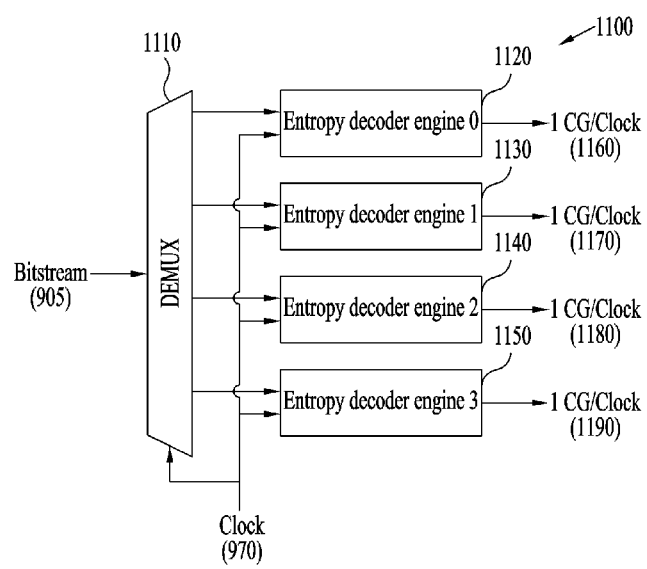
Figure 11:
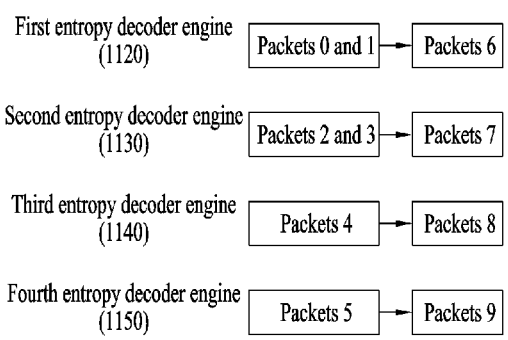

FIGS. 10 and 11 illustrate the structure of an entropy decoder according to the present disclosure.

In the example of FIGS. 10 and 11, a precinct to which the present disclosure is applied may include 10 packets, i.e., packet 0 to packet 9 (e.g., refer to 340 of FIG. 3 and 630 of FIG. 6). However, the principle of the present disclosure is not limited thereto. In this case, packet 0 and packet 1 may include wavelet coefficient information or code groups corresponding to a left half of the first line (or line 0) of the precinct, packet 2 and packet 3 may include wavelet coefficient information or code groups corresponding to a left half of the second line (or line 1) of the precinct, packet 4 may include wavelet coefficient information or code groups corresponding to a right half of the first line (or line 0) of the precinct, packet 5 may include wavelet coefficient information or code groups corresponding to a left half of the third line (or line 2) of the precinct, packet 6 may include wavelet coefficient information or code groups corresponding to a right half of the third line (or line 2) of the precinct, packet 7 may include wavelet coefficient information or code groups corresponding to a right half of the second line (or line 1) of the precinct, packet 8 may include wavelet coefficient information or code groups corresponding to a left half of the fourth line (or line 3) of the precinct, and packet 9 may include wavelet coefficient information or code groups corresponding to a right half of the fourth line (or line 3) of the precinct (e.g., refer to FIG. 3 and a related description).

Referring to FIG. 10(*a*), an entropy decoder 1000 according to the present disclosure may include a demultiplexer 1010, an entropy decoder engine 0 (1020), and an entropy decoder engine 1 (1030). In this specification, the entropy decoder engine 0 (1020) is referred to as a first entropy decoder engine, and the entropy decoder engine 1 (1030) is referred to as a second entropy decoder engine.

The demultiplexer 1010 may be configured to demultiplex packets (e.g., packet 0 to packet 9) of a current precinct into a plurality of first packets (e.g., packet 0, packet 1, packet 4, packet 6, and packet 8) and a plurality of second packets (e.g., packet 2, packet 3, packet 5, packet 7, and packet 9) and transmit the first plural packets to the first entropy decoder engine 1020 and the second plural packets to the second entropy decoder engine 1030.

Each of the first entropy decoder engine 1020 and the second entropy decoder engine 1030 corresponds to the entropy decoder engine 900. Accordingly, each of the first entropy decoder engine 1020 and the second entropy decoder engine 1030 may be configured in a pipelined manner to entropy-decode packets transmitted from the demultiplexer 1010 in packet units and output one code group 1040 or 1050 at every clock based on the clock signal 970. In relation to a specific operation of each of the first entropy decoder engine 1020 and the second entropy decoder engine 1030, the entire description of the entropy decoder engine 900 is incorporated by reference.

Referring to FIG. 10(*b*), the first entropy decoder engine 1020 and the second entropy decoder engine 1030 may respectively entropy-decode, in parallel, the first plural packets and the second plural packets received from the demultiplexer 1010. For example, entropy decoding for packet 0 and packet 1 by the first entropy decoder engine 1020 and entropy decoding for packet 2 and packet 3 by the second entropy decoder engine 1030 may be performed in parallel, entropy decoding for packet 4 by the first entropy decoder engine 1020 and entropy decoding for packet 5 by the second entropy decoder engine 1030 may be performed in parallel, entropy decoding for packet 6 by the first entropy decoder engine 1020 and entropy decoding for packet 7 by the second entropy decoder engine 1030 may be performed in parallel, and entropy decoding for packet 8 by the first entropy decoder engine 1020 and entropy decoding for packet 9 by the second entropy decoder engine 1030 may be performed in parallel.

In the example of FIG. 10, assuming that the clock signal 970 is set to 480 MHz and one code group includes four quantization index information or wavelet coefficient information, since each of the entropy decoder engines 1020 and 1030 may decode a maximum of 4.8 million code groups per second, the entropy decoder 1000 according to the present disclosure may decode up to 9.6 million code groups per second. Thus, the entropy decoder 1000 according to the present disclosure may entropy-decode, in real time, a video signal having a resolution of 4K (e.g., 4096×2160), a frame rate of 120 Hz, and a YCbCr 444 format required for decoding performance of about 8 million (=4096×2160×3× 120/4) code groups and also entropy-decode, in real time, a video signal having a resolution of 8K (e.g., 8192×4320), a frame rate of 30 Hz, and a YCbCr 444 format.

Referring to FIG. 11(*a*), an entropy decoder 1100 according to the present disclosure may include a demultiplexer 1110, an entropy decoder engine 0 (1120), an entropy decoder engine 1 (1130), an entropy decoder engine 2 (1140), and an entropy decoder engine 3 (1150). In this specification, the entropy decoder engine 0 (1020) is referred to as a first entropy decoder engine, the entropy decoder engine 1 (1030) is referred to as a second entropy decoder engine, the entropy decoder engine 2 (1140) is referred to as a third entropy decoder engine, and the entropy decoder engine 3 (1150) is referred to as a fourth entropy decoder engine.

The demultiplexer 1110 may be configured to demultiplex packets of a current precinct (e.g., packet 0 to packet 9) into a plurality of first packets (e.g., packet 0, packet 1, and packet 6)), a plurality of second packets (e.g., packet 2, packet 3, and packet 7), a plurality of third packets (e.g., packet 4 and packet 8), and a plurality of fourth packets (e.g., packet 5, packet 9), transmit the first plural packets to the first entropy decoder engine 1120, transmit the second plural packets to the second entropy decoder engine 1130, transmit the third plural packets to the third entropy decoder engine 1140, and transmit the fourth plural packets to the fourth entropy decoder engine 1150.

Each of the entropy decoder engines 1120, 1130, 1140, and 1150 corresponds to the entropy decoder engine 900. Accordingly, each of the entropy decoder engines 1120, 1130, 1140, and 1150 may be configured in a pipelined manner to entropy-decode packets transmitted from the demultiplexer 1110 in packet units and output one code group 11160, 1170, 1180, or 1190 at every clock based on the clock signal 970. In relation to a specific operation of each of the entropy decoder engines 1120, 1130, 1140, and 1150, the entire description of the entropy decoder engine 900 is incorporated by reference.

Referring to FIG. 11(*b*), the first entropy decoder engine 1120, the second entropy decoder engine 1130, the third entropy decoder engine 1140, and the fourth entropy decoder engine 1150 may respectively entropy-decode, in parallel, the first plural packets, the second plural packets, the third plural packets, and the fourth plural packets received from the demultiplexer 1110. For example, entropy decoding for packets 0 and 1 by the first entropy decoder engine 1120, entropy decoding for packets 2 and 3 by the second entropy decoder engine 1130, entropy decoding for packet 4 by the third entropy decoder engine 1140, and entropy decoding for packet 5 by the fourth entropy decoder engine 1150 may be performed in parallel. In addition, entropy decoding for packet 6 by the first entropy decoder engine 1120, entropy decoding for packet 7 by the second entropy decoder engine 1130, entropy decoding for packet 8 by the third entropy decoder engine 1140, and entropy decoding for packet 9 by the second entropy decoder engine 1150 may be performed in parallel.

In the example of FIG. 11, assuming the clock signal 970 is set to 480 MHz and one code group includes four quantization index information or wavelet coefficient information, since each of the entropy decoder engines 1120, 1130, 1140, and 1150 may decode a maximum of 4.8 million code groups per second, the entropy decoder 1100 according to the present disclosure may entropy-decode up to 19.2 million code groups per second. Thus, the entropy decoder in accordance with the present disclosure may entropy-decode, in real time, a video signal having a resolution of 8K (e.g., 8192×4320), a frame rate of a 60 Hz, and a YCbCr 444 format required for decoding performance of about 15.9 million (=8182×4320×60×¾) code groups per second.

Figure 12:
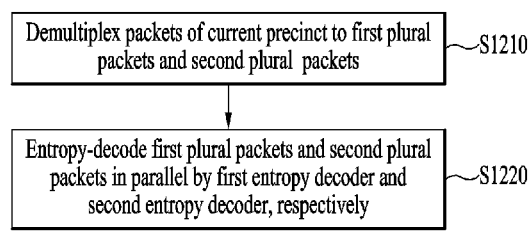
FIGS. 12 and 13 illustrate flowcharts of an entropy decoding method according to the present disclosure
Figure 13:
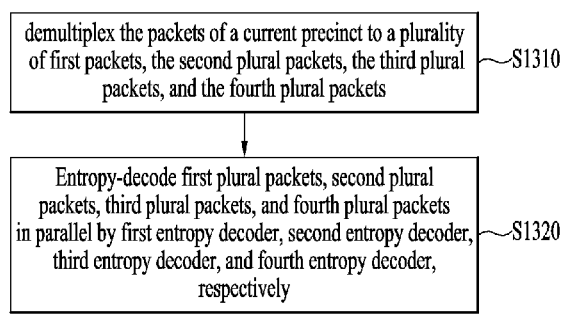

FIGS. 12 and 13 illustrate flowcharts of an entropy decoding method according to the present disclosure. FIG. 12 illustrates a flowchart of a method performed by the entropy decoder 1000, and FIG. 13 illustrates a flowchart of a method performed by the entropy decoder 1100.

Referring to FIG. 12, the entropy decoder 1000 may demultiplex packets of a current precinct into a plurality of first packets and a plurality of second packets (S1210). As described with reference to FIG. 10, the first plural packets may be transmitted to the first entropy decoder engine 1020, and the second plural packets may be transmitted to the second entropy decoder engine 1030. The first plural packets may include packet 0, packet 1, packet 4, packet 6, and packet 8, and the second plural packets may include packet 2, packet 3, packet 5, packet 7, and packet 9.

The entropy decoder 1000 may entropy-decode the first plural packets and the second plural packets in parallel (S1220). A specific operation of parallel entropy decoding may include the operation described with reference to FIG. 10, the entire description of which is incorporated by reference.

For example, the method of FIG. 12 may be performed in step S720 of FIG. 7. Accordingly, the decoding device 10 (e.g., refer to FIG. 14) may perform image decoding including steps S710 to S760, in which step S720 may be performed by the entropy decoder 1000 based on the method of FIG. 12. Further, the entropy decoding method for each packet may correspond to the method described with reference to FIG. 8. Thus, in relation to a detailed description of the method of FIG. 12, the entire description of FIG. 8 and the entire description of FIG. 10 are incorporated by reference.

Referring to FIG. 13, the entropy decoder 1100 may demultiplex the packets of a current precinct into a plurality of first packets, a plurality of second packets, a plurality of third packets, and a plurality of fourth packets (S1310). As described with reference to FIG. 11, the first plural packets may be transmitted to the first entropy decoder engine 1120, the second plural packets may be transmitted to the second entropy decoder engine 1130, the third plural packets may be transmitted to the third entropy decoder engine 1140, and the fourth plural packets may be transmitted to the fourth entropy decoder engine 1150. The first plural packets may include packet 0, packet 1, and packet 6, the second plural packets may include packet 2, packet 3, and packet 7, the third plural packets may include packet 4 and packet 8, and the fourth plural packets may include packet 5 and packet 9.

The entropy decoder 1100 may entropy-decode the first plural packets, the second plural packets, the third plural packets, and the fourth plural packets in parallel (S1320). A specific operation of parallel entropy decoding may include the operation described with reference to FIG. 11, the entire description of which is incorporated by reference.

For example, the method of FIG. 13 may be performed in step S720 of FIG. 7. Accordingly, the decoding device 10 (e.g., refer to FIG. 14) may perform image decoding including steps S710 to S760, in which step S720 may be performed in the entropy decoder 1100 based on the method of FIG. 13. Further, the entropy decoding method for each packet may correspond to the method described with respect to FIG. 8. Thus, in relation to a detailed description of the method of FIG. 13, the entire description of FIG. 8 and the entire description of FIG. 11 are incorporated by reference.

While the present disclosure has been described with respect to the case in which one precinct includes 10 packets based on 5-level horizontal decomposition and 2-level vertical decomposition, an example of the precinct is intended only to aid in understanding, and the present disclosure is not limited only to this precinct. The present disclosure may be applied in the same or similar manner even if one precinct includes another number of packets. For example, if wavelet transformation according to 5-level horizontal decomposition and 1-level vertical decomposition is applied, one precinct may be configured to include four packets of packet 0 to packet 3. Packet 0 includes wavelet coefficient information or code groups corresponding to a left half of the first line (or line 0) of the precinct, packet 1 includes wavelet coefficient information or code groups corresponding to a right half of the second line (or line 1) of the precinct, packet 2 includes wavelet coefficient information or code groups corresponding to a left half of the second line (or line 1) of the precinct, and packet 3 includes wavelet coefficient information or code groups corresponding to the right half of the second line (or line 1) of the precinct. In this case, when parallel processing is performed based on the two entropy decoder engines 1020 and 1030, demultiplexed packets 0 and 2 may be transmitted to the first entropy decoder engine 1020, demultiplexed packets 1 and 3 may be transmitted to the second entropy decoder engine 1030, packets 0 and 1 may be entropy-decoded in parallel by the first entropy decoder engine 1020 and a second entropy decoder engine 1030, respectively, and packet 2 and packet 3 may be entropy-decoded in parallel by the first entropy decoder engine 1020 and the second entropy decoder engine 1030, respectively. Alternatively, when parallel processing is performed based on the four entropy decoder engines 1120, 1130, 1140, and 1150 according to the present disclosure, demultiplexed packet 0 may be transmitted to the first entropy decoder engine 1120, demultiplexed packet 1 may be transmitted to the second entropy decoder engine 1130, demultiplexed packet 2 may be transmitted to the third entropy decoder engine 1140, demultiplexed packet 3 may be transmitted to the fourth entropy decoder engine 1150, and packet 0 to packet 3 may be decoded in parallel by the first entropy decoder engine to the fourth entropy decoder engine 1120 to 1150, respectively.

Figure 14:
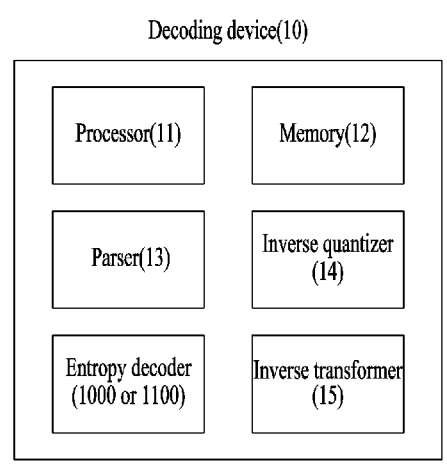
FIG. 14 is a block diagram of a decoding device according to the present disclosure.

FIG. 14 is a block diagram of a decoding device 10 according to the present disclosure. For example, the decoding device 10 may be included in a mobile terminal such as a smartphone, a portable device such as a laptop computer, or a home appliance such as a digital TV or a digital video player. As another example, the decoding device 10 may be included as a part of an application specific integrated circuit (ASIC) and may be implemented in the form of a system-on-chip (SoC).

A memory 12 may store a program for processing and control of the processor 11 and store an encoded bitstream, a restored image, control information, etc. In addition, the memory 12 may be used as a buffer for bitstreams and images. The memory 12 may be implemented by a storage device such as a read only memory (ROM), a random access memory (RAM), an erasable programmable read only memory (EPROM), an electrically erasable programmable read only memory (EEPROM), a flash memory, a static RAM (SRAM), a hard disk drive (HDD), or a solid state drive (SSD).

The processor 11 controls the operation of each module in the decoding device 10. In particular, the processor 11 may perform some functions and/or control functions for performing the decoding method according to the present disclosure (e.g., refer to FIGS. 7, 8, 12, and 13). The processor 11 may be referred to as a controller, a microcontroller, a microprocessor, a microcomputer, or the like. The processor 11 may be implemented by hardware, firmware, software, or a combination thereof. When the present disclosure is implemented using hardware, an application specific integrated circuit (ASIC), a digital signal processor (DSP), a digital signal processing device (DSPD), a programmable logic device (PLD), or a field programmable gate array (FPGA), configured to perform the present disclosure, may be provided in the processor 11. When the present disclosure is implemented using firmware or software, firmware or software may be configured to include a module, a procedure, or a function for performing the functions or operations of the present disclosure. Firmware or software configured to perform the present disclosure may be provided in the processor 11 or may be stored in a memory 12 and then be executed by the processor 11.

The decoding device 10 may include the entropy decoder 1000 or 1100 according to the present disclosure. The decoding device 10 may optionally include a parser 13, an inverse quantizer 14, and an inverse transformer 15. The parser 13 may be configured to perform the operation described in step S710 of FIG. 7. The parser 13 may be implemented by dedicated hardware or a part of the demultiplexers 1010 and 1110. Alternatively, the processor 11 may be configured to replace the function of the parser 13. When the parser 13 is implemented by dedicated hardware, the parser 13 may be operatively connected to one or more of the processor 11, the memory 12, the entropy decoders 1000 and 1100, the inverse quantizer 14, and the inverse transformer 15 and may parse a bitstream to provide obtained syntax information and (entropy-coded) data (e.g., packets).

The inverse quantizer 14 may be configured to perform the operation described in S730 of FIG. 7, and the inverse transformer 15 may be configured to perform the operation described in S750 of FIG. 7. The inverse quantizer 14 and/or the inverse transformer 15 may be implemented by dedicated hardware or a general-purpose processor. Alternatively, the processor 11 may be configured to replace the function of the inverse quantizer 14 and/or the inverse transformer 15.

In addition, the decoding device 10 may include dedicated hardware or a general-purpose processor (not shown) for performing the operations corresponding to steps S750 and S760. Alternatively, these operations may be performed by the processor 11.

In addition, the decoding device 10 may optionally include a network interface module (NIM) (not shown). The NIM is operatively connected to the processor 11, and the processor 11 may control the NIM to transmit or receive wireless/wired signals carrying information, data, signals, and/or messages via a wireless/wired network. The NIM may support various communication standards such as IEEE 802 series, 3GPP LTE(-A), Wi-Fi, advanced television system committee (ATSC), digital video broadcasting (DVB), etc. and transmit and receive image signals such as control information and/or encoded bitstreams according to a corresponding communication standard. The NIM may not be included in the device if necessary.

In addition, the device 10 may optionally include an input/output interface (not shown). The input/output interface is operatively connected to the processor 11, and the processor 11 may control the input/output interface to receive or output control signals and/or data signals. The input/output interface may support standards such as a universal serial bus (USB), Bluetooth, near field communication (NFC), a serial/parallel interface, a digital visual interface (DVI), and a high definition multimedia interface (HDMI), so that the input/output interface may be connected to input devices such as a keyboard, a mouse, a touchpad, and a camera and to output devices such as a display.

The methods and embodiments described hereinabove are combinations of elements and features of the present disclosure. The elements or features should be considered selective unless otherwise mentioned. Each element or feature may be practiced without being combined with other elements or features. Further, parts of the elements and/or the features may be combined to configure an embodiment of the present disclosure. Operation orders described in embodiments of the present disclosure may be rearranged. Some elements or features of any one embodiment may be included in another embodiment or may be replaced with corresponding elements or features of another embodiment. It will be obvious that claims that are not explicitly cited in each other in the appended claims may be presented in combination as an embodiment or may be included as a new claim by subsequent amendment after the application is filed.

The embodiments of the present disclosure may be achieved by various means, for example, hardware, firmware, software, or combinations thereof. In a hardware configuration, an embodiment of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the present disclosure may be implemented by software code or instructions including the form of a module, a procedure, or a function that performs the functions or operations described hereinabove. The software code or instructions may be stored in a computer readable medium and executed by a processor and, when executed by the processor, may perform the operations according to the present disclosure. The computer readable medium may be located inside or outside the processor or may be remotely connected to the processor over a network, and may transmit and receive data to and from the processor.

Those skilled in the art will appreciate that the present disclosure may be carried out in other specific ways than those set forth herein without departing from the spirit and essential characteristics of the present disclosure. The detailed description is therefore to be construed in all aspects as illustrative and not restrictive. The scope of the disclosure should be determined by the appended claims and their legal equivalents, and all changes coming within the meaning and equivalency range of the appended claims are intended to be embraced therein.

INDUSTRIAL APPLICABILITY

The present disclosure may be used in an image processing device such as a decoding device or an encoding device.

The invention claimed is:

1. A device for decoding a bitstream for a video signal including at least one precinct, the device comprising:
a first entropy decoder engine;
a second entropy decoder engine; and
a demultiplexer configured to demultiplex packets of a current precinct among the at least one precinct into a plurality of first packets and a plurality of second packets, transmit the first plural packets to the first entropy decoder engine, and transmit the second plural packets to the second entropy decoder engine,
wherein the first entropy decoder engine and the second entropy decoder engine perform parallel entropy decoding on the first plural packets and the second plural packets, respectively,
wherein the first plural packets include packet 0, packet 1, packet 4, packet 6, and packet 8, and the second plural packets include packet 2, packet 3, packet 5, packet 7, and packet 9,
wherein the packets 0 and 1 include code groups corresponding to a left half of a first line of the current precinct, the packets 2 and 3 include code groups corresponding to a left half of a second line of the current precinct, the packet 4 includes code groups corresponding to a right half of the first line of the current precinct, the packet 5 includes code groups corresponding to a left half of a third line of the current precinct, the packet 6 includes code groups corresponding to a right half of the third line of the current precinct, the packet 7 includes code groups corresponding to a right half of the second line of the current precinct, the packet 8 includes code groups corresponding to a left half of a fourth line of the current precinct, and the packet 9 includes code groups corresponding to a right half of the fourth line of the current precinct, wherein one code group includes 4 quantization index information, and the quantization index information indicates quantized wavelet coefficient information, and wherein a position of each packet in the current precinct depends on a wavelet transformation.

2. The device of claim 1, wherein the parallel entropy decoding includes parallel entropy decoding performed on packets 0 and 1 by the first entropy decoder engine and packets 2 and 3 by the second entropy decoder engine, parallel entropy decoding performed on packet 4 by the first entropy decoder engine and packet 5 by the second entropy decoder engine, parallel entropy decoding performed on packet 6 by the first entropy decoder engine and packet 7 by the second entropy decoder engine, and parallel entropy decoding performed on packet 8 by the first entropy decoder engine and packet 9 by the second entropy decoder engine.

3. The device of claim 1, wherein each of the first entropy decoder engine and the second entropy decoder engine is configured to output one code group at every clock in a pipeline manner based on a clock signal.

4. The device of claim 1, wherein the entropy decoding includes
obtaining residual information from a bitplane count subpacket of a packet including a current code group,
obtaining a predictor based on bitplane count information of a higher line of the current code group, and
obtaining bitplane count information of the current code group based on the residual information and the predictor.

5. The device of claim 4, wherein the residual information is obtained based on a lookup table including a variable length code.

6. The device of claim 5, wherein the lookup table includes a 32x1 multiplexer.

7. The device of claim 4,
wherein the entropy decoding further includes obtaining sign information and quantization index magnitude information from the data subpacket of the packet including the current code group based on the bitplane count information of the current code group, and
wherein the sign information indicates a sign of wavelet coefficient information, and the quantization index magnitude information indicates an absolute value of quantized wavelet coefficient information.

8. The device of claim 4, wherein the entropy decoding includes
obtaining quantization index magnitude information from a data subpacket including the current code group based on the bitplane count information of the current code group, and
obtaining sign information from a sign subpacket including the current code group based on the quantization index magnitude information, and
wherein the sign information indicates a sign of wavelet coefficient information, and the quantization index magnitude information indicates an absolute value of quantized wavelet coefficient information.

9. The device of claim 1, further comprising an inverse quantizer configured to restore wavelet coefficient information by performing inverse quantization based on entropy-decoded data.

10. The device of claim 9, further comprising an inverse transformer configured to restore a sample by performing inverse discrete wavelet transformation based on the wavelet coefficient information.

11. A method of decoding a bitstream for a video signal including at least one precinct, the method performed by a decoding device including a first entropy decoder engine and a second entropy decoder engine and comprising:
demultiplexing packets of a current precinct among the at least one precinct into a plurality of first packets and a plurality of second packets; and
entropy-decoding the first plural packets and the second plural packets in parallel,
wherein the first plural packets and the second plural packets are entropy-decoded in parallel by the first entropy decoder engine and the second entropy decoder engine, respectively,
wherein the first plural packets include packet 0, packet 1, packet 4, packet 6, and packet 8, and the second plural packets include packet 2, packet 3, packet 5, packet 7, and packet wherein the packets 0 and 1 include code groups corresponding to a left half of a first line of the current precinct, the packets 2 and 3 include code groups corresponding to a left half of a second line of the current precinct, the packet 4 includes code groups corresponding to a right half of the first line of the current precinct, the packet 5 includes code groups corresponding to a left half of a third line of the current precinct, the packet 6 includes code groups corresponding to a right half of the third line of the current precinct, the packet 7 includes code groups corresponding to a right half of the second line of the current precinct, the packet 8 includes code groups corresponding to a left half of a fourth line of the current precinct, and the packet 9 includes code groups corresponding to a right half of the fourth line of the current precinct,
wherein one code group includes 4 quantization index information, and the quantization index information indicates quantized wavelet coefficient information, and
wherein a position of each packet in the current precinct depends on a wavelet transformation.

* * * * *